(12) United States Patent
Farnsworth et al.

(10) Patent No.: US 8,331,253 B2
(45) Date of Patent: Dec. 11, 2012

(54) METHOD AND APPARATUS FOR CONFIGURING COMPRESSED MODE

(75) Inventors: Andrew Farnsworth, Birmingham (GB); Ximing Zhu, Waterloo (CA); Anton Pavlovich, Waterloo (CA); Craig Swann, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 604 days.

(21) Appl. No.: 12/565,546

(22) Filed: Sep. 23, 2009

(65) Prior Publication Data

US 2010/0075660 A1    Mar. 25, 2010

Related U.S. Application Data

(60) Provisional application No. 61/100,146, filed on Sep. 25, 2008.

(51) Int. Cl.
*H04J 3/14* (2006.01)
(52) U.S. Cl. ....................................... 370/252
(58) Field of Classification Search .................... 370/252
See application file for complete search history.

(56) References Cited

U.S. PATENT DOCUMENTS 6,489,902 B2 * 12/2002 Heath ............................. 341/87
7,599,336 B2 * 10/2009 Vayanos et al. ................ 370/335
8,116,380 B2 * 2/2012 Regunathan et al. .... 375/240.25

OTHER PUBLICATIONS

3GPP TS 25.133 v5.18.0; 3rd Generation Partnership Project; Technical Specification Group Radio Access Network; Requirements for Support of Radio Resource Management (FDD); Release 5; Sep. 2007; 82 pgs.
3GPP TS 25.331 v5.19.0; 3rd Generation Partnership Project; Technical Specification Group Radio Access Network; Radio Resource Control (RRC); Protocol Specification; Release 5; Dec. 2006; 1045 pgs.
3GPP TS 25.331 v5.18.0; 3rd Generation Partnership Project; Technical Specification Group Radio Access Network; Radio Resource Control (RRC); Protocol Specification; Release 5; Sep. 2006; 1045 pgs.

* cited by examiner

*Primary Examiner* — Chandrahas Patel
(74) *Attorney, Agent, or Firm* — Conley Rose, P.C.; J. Robert Brown, Jr.

(57) ABSTRACT

A method and apparatus for configuring compressed mode operation comprises detecting a compressed mode pattern or pattern sequence scheduling three or more consecutive compressed mode frames and taking appropriate mitigation action. In a first aspect a non activation construction is suppressed and the compressed mode pattern sequence is activated. In the second aspect if a pattern or sequence scheduling three or more consecutive compressed mode frames is identified, activation is suppressed. In a third aspect if such a patent or sequence is identified, a normal frame is inserted in the pattern sequence replacing a compressed mode frame.

2 Claims, 6 Drawing Sheets

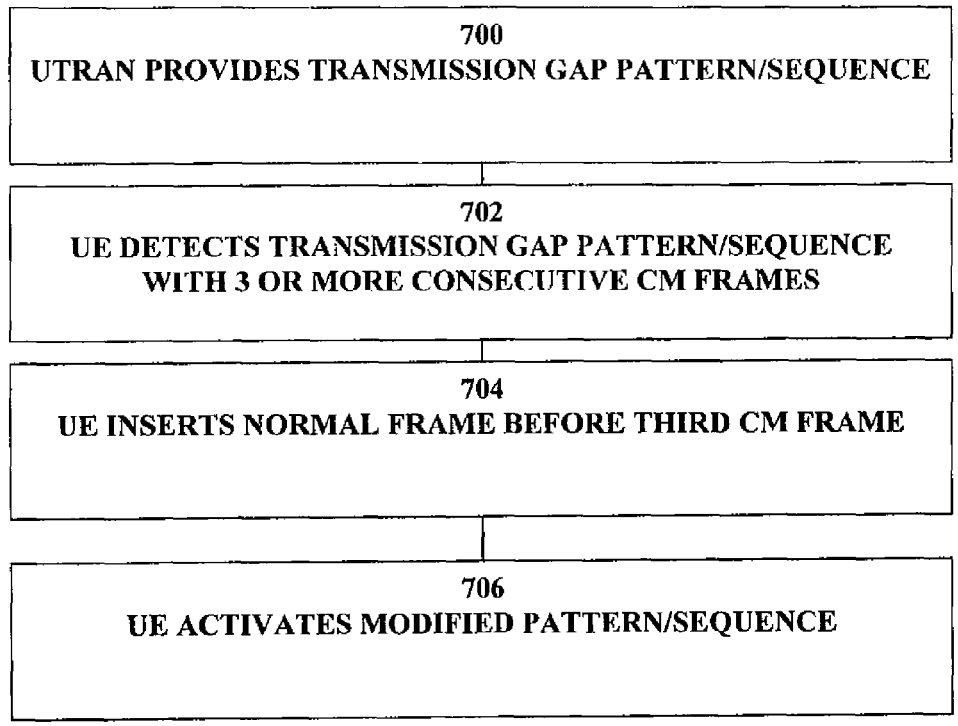
FIG. 7
FIG. 8
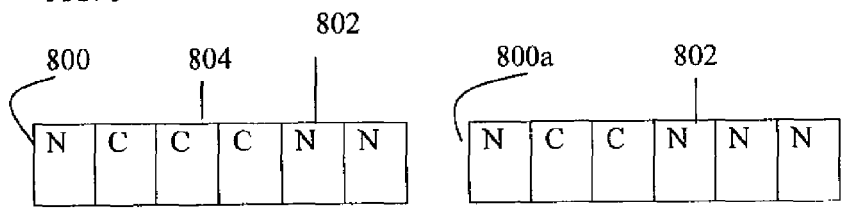

METHOD AND APPARATUS FOR CONFIGURING COMPRESSED MODE

CROSS-REFERENCE TO RELATED APPLICATIONS

The present application claims priority to U.S. provisional patent application No. 61/100,146, filed Sep. 25, 2008, by Andrew Farnsworth et al, entitled "Method and Apparatus for Compressed Mode" (33771-US-PRV-4214-12600), which is incorporated by reference herein as if reproduced in its entirety.

BACKGROUND

This application relates to telecommunications systems in general, having for example application in UMTS (Universal Mobile Telecommunications System). In particular, this application relates to a method and apparatus for configuring compressed mode.

In a typical cellular radio system, a mobile communications apparatus communicates via a radio access network (RAN) to one or more core networks. The mobile communications apparatus or User Equipment (UE) comprises various types of equipment such as mobile telephones (also known as cellular or cell phones), laptops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the invention is not intended to be limited to any particular mobile telecommunications system or standard.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for UMTS based upon GSM (Global System for Mobile Communications), and the 3GPP2 (Third Generation Partnership Project 2) has been known to publish and set standards for UMTS based upon CDMA (Code Division Multiple Access). Within the scope of a particular standardization body, specific partners publish and set standards in their respective areas.

Consider as an example a wireless mobile device which complies with the 3GPP specifications for the UMTS protocol. Such a wireless mobile device is generally referred to as user equipment (UE). The 3GPP technical specification 25.331, V5.18.0, referred to herein as the 25.331 specification, and incorporated herein by reference, addresses the subject of Radio Resource Control protocol for the UE-UTRAN (UTRA Network) interface.

A UMTS Terrestrial Radio Access Network (UTRAN) is designed to operate in bands using Frequency Division Duplex (FDD).

A UE arranged to communicate on an FDD network may utilize compressed mode (CM) during communication with the network. Compressed mode is needed inter alia when making measurements on another frequency (inter-frequency) or on a different Radio Access Technology (inter-RAT). Inter-frequency measurements are performed between the channels of different frequencies within the same or a different UMTS band. Inter-RAT measurements are performed between the channels of different Radio Access Technologies (e.g. GSM and UMTS). In the compressed mode, transmission and reception by the UE transceiver on the band the UE is camped on is stopped for a short time. This time is called the Transmission Gap. This allows the transceiver to be used to perform measurements on the other frequency. Once the measurement has been made, transmission and reception resumes on the band the UE is camped on. Compressed Mode (CM) is the term used to define the method whereby the average data rate is maintained by compressing data in the frame either side of the transmission gap required for the measurement.

FIG. 1 illustrates the implementation of compressed mode. Time is on the horizontal axis and instantaneous transmit power is on the vertical axis. In FIG. 1, one frame (e.g. 307) is shown as having duration of 10 milliseconds. Each frame comprises a plurality of slots. A series of frames 301 have transmission gaps 303 and 304. A more detailed view 302 of four frames around the transmission gap 303 is also shown. In compressed mode, a series of slots are not used for transmission of data. The number of consecutive slots in the series not used for transmission defines the transmission gap length where the gap is within the compressed mode frame. Either side of the transmission gap 303 the instantaneous transmit power of the slots of the frame remaining (305, 306) for data transmission is increased in order to keep the quality of the communication link unaffected by the reduced time available for transmission. Alternatively the transmission gap may occur at the respective end and start of consecutive CM frames. Examples of the measure of quality are Bit Error Rate (BER) and Frame Error Rate (FER), although any other appropriate measure of quality may be used. The size of the increase in instantaneous transmit power is dependent upon the transmission time reduction method and may be zero.

A transmission gap is necessary because UEs typically only have one transceiver. UE capabilities vary and the capabilities of a particular UE define whether it requires compressed mode in order to monitor cells on other frequencies. Accordingly, it is necessary for a UE to communicate its compressed mode requirements to the UTRAN. The compressed mode requirement may be expressed for any number of bands and radio access technologies.

The mechanism allowing information transmitted during at least one portion of a frame to be compressed in time, and a transmission gap to be created, include: reducing the spreading factor; and higher layer scheduling.

Reducing the Spreading Factor: the Spreading Factor is reduced by a factor of 2 so the data rate is doubled in the frame in which compression is to be carried out. The Spreading Factor is the ratio of the chips to base band information rate, the chips being the smallest element of a slot. Because the data rate is doubled the same amount of data can be transmitted in half the time. Measurements can be performed in the transmission gap that remains.

Higher Layer scheduling: The higher layers are aware of the compressed mode schedule, so they may lower the data rate in the frame in which measurements need to be performed. This avoids the need for a new spreading factor and new channelization codes. For example, higher layers may set restrictions so that only a subset of the allowed Transport Format Combinations (TFCs) are used in a compressed frame.

The bit rate available for communication between the UE and the UTRAN is determined by a Transport Format Combination. Accordingly, by defining a subset of Transport Format Combinations available for use, the maximum number of bits that will be delivered to the physical layer during the compressed radio frame is then known and a transmission gap can be generated. In the downlink, the Transport Format Combination Indicator field is expanded at the expense of the data fields and this shall also be taken into account by higher layers when setting restrictions on which TFCs may be used.

In both downlink and uplink, both the above methods are supported. The network decides which frames are to be compressed. In compressed mode, compressed frames can occur periodically, as indicated in FIG. 1. Alternatively, compressed frames can occur on request or upon demand. The rate and type of compressed frames used is variable and depends on the environment and measured variables.

The UTRAN can schedule compressed mode patterns for implementation by the UE. A pattern can be finite in which case it will terminate at a given connection frame number (CFN) or can be infinite and terminated by the UTRAN which subsequently specifies the CFN where the pattern should end. Frames are numbered 0 to 255 cyclically independent of CM gaps.

This can be further understood from FIG. 2. At step 200 the UTRAN provides a transmission gap pattern sequence. At step 202 the user equipment activates the transmission gap pattern sequence. At step 204 the UE may take appropriate additional steps for example performing a measurement as described above.

According to section 8.1.2 of the 25.133 standard the UTRAN must ensure that with the activation of one or more transmission gap pattern sequences, no more than two frames can contain a transmission gap within any window of three consecutive frames. If the UTRAN schedules three or more CM gaps in a row, then the signal to interference ratio (SIR) calculation can not be performed which can lead to incorrect UE operation. However, in practice, it is found that in some instances the UTRAN appears to schedule three or more CM frames in a row for example due to transmission delay. In particular this can occur in the scenario shown, for example, in FIG. 3 in which a first 310 is deactivated and a second pattern 312 is subsequently activated. The patterns include normal frames 314, and compressed mode frames 316 and it will be seen that the first sequence 310 terminates in two compressed mode frames containing transmission gaps whereas the second pattern 312 commences with two compressed modes frames containing transmission gaps. In such circumstances the device can reset as a failure mode.

The invention is set out in the claims:

BRIEF DESCRIPTION OF THE DRAWINGS

Embodiments will now be described, by way of example only, with reference to the attached drawings, of which:

FIG. 7 shows a flow diagram of a method according to a third aspect;

FIG. 8 shows a transmission gap pattern modified according the third aspect.

DETAILED DESCRIPTION OF THE DRAWINGS

Described herein is a method for configuring compressed mode operation in such a manner as to avoid the problems that can be incurred when a UTRAN appears to schedule three or more consecutive compressed mode frames.

Other aspects and features of the proposed strategy will become apparent to those ordinarily skilled in the art upon review of the following description of specific embodiments of a method and apparatus for improved compressed mode capabilities.

A method and apparatus for configuring of compressed mode operation is described. In the following description, for the purposes of explanation, numerous specific details are set forth in order to provide a thorough understanding of the claims. It will be apparent to one skilled in the art that the technique may be practiced without these specific details. In the other instances, well-known structures and devices are shown in block diagram form in order to avoid unnecessarily obscuring the content of this document.

The needs identified in the foregoing background, and other needs that will become apparent from the following description, are achieved by, in one aspect, a method for configuring the compressed mode operation of a mobile communications apparatus to a communications network. In other aspects, the needs are achieved by a mobile communications apparatus operable to communicate with at least one network using a plurality of bands. In yet other aspects, the needs are achieved by a computer readable medium or computer program product comprising code means stored on a computer readable medium for performing the method of communicating compressed mode requirements of a mobile communications apparatus to a network. In particular, the method may be implemented in a mobile telecommunications apparatus, with or without voice capabilities, or other electronic devices such as handheld or portable devices.

Figure 4:
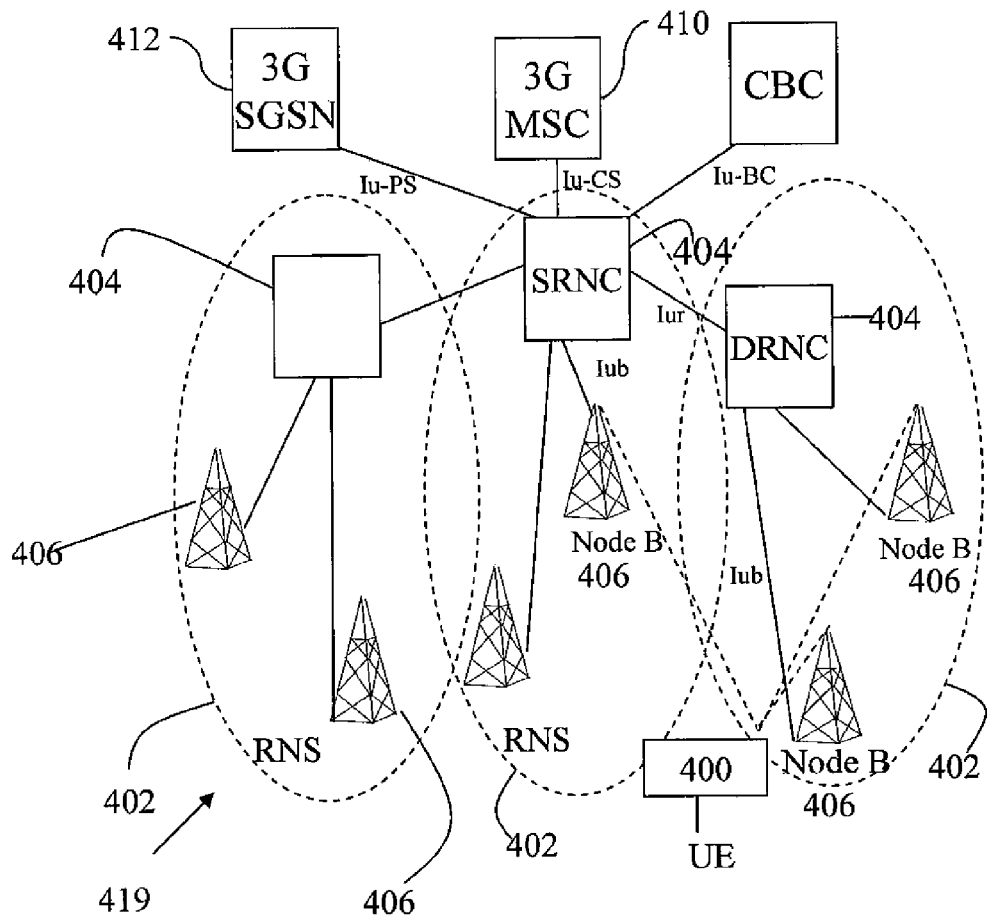
FIG. 4 is a schematic of a UMTS network.

The method disclosed herein may be implemented in a user equipment device of a wireless communications network. Referring to the drawings, FIG. 4 is a schematic diagram showing an overview of a network and a user equipment device. Clearly in practice there may be many user equipment devices operating with the network but for the sake of simplicity FIG. 4 only shows a single user equipment device 400. For the purposes of illustration, FIG. 4 also shows a radio access network 419 (UTRAN) used in a UMTS system having a few components. It will be clear to a person skilled in the art that in practice a network will include far more components than those shown.

The network 419 as shown in FIG. 4 comprises three Radio Network Subsystems (RNS) 406. Each RNS has a Radio Network Controller (RNC) 404. Each RNS 402 has one or more Node B 402 which are similar in function to a Base Transmitter Station of a GSM radio access network. User Equipment UE 400 may be mobile within the radio access network. Radio connections (indicated by the straight dotted lines in FIG. 4) are established between the UE and one or more of the Node Bs in the UTRAN.

Figure 5:
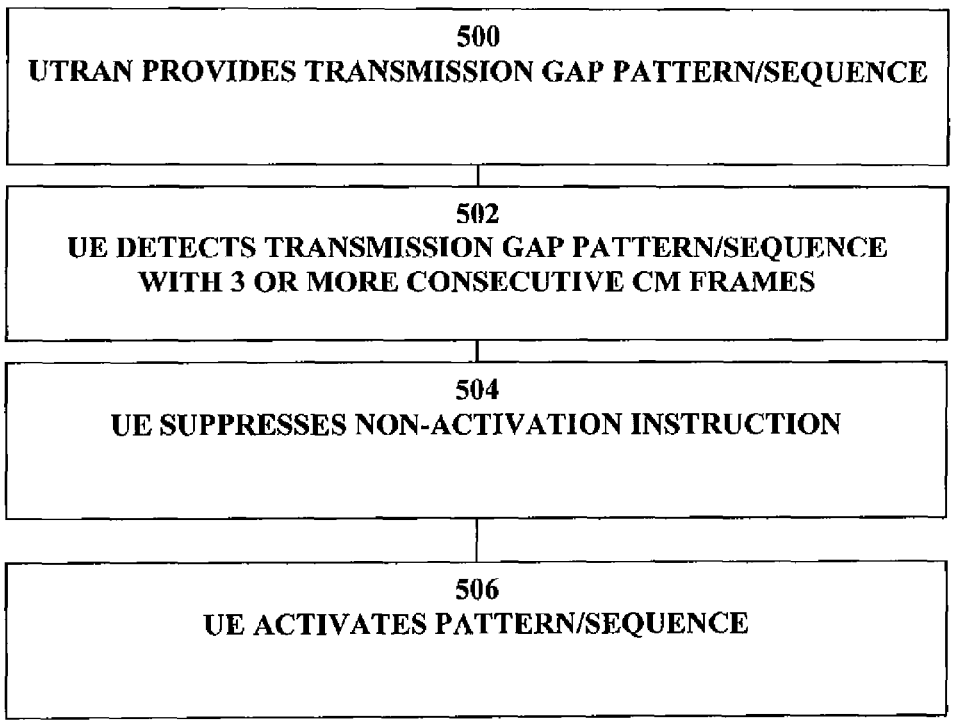
FIG. 5 shows a flow diagram of a method according to a first aspect.

According to a first mitigation routine, as described in FIG. 5, when the UE detects that activation of a compressed mode pattern or a sequence of consecutive compressed mode patterns will necessitate the scheduling of three or more consecutive compressed mode gaps, any compressed mode warning or reset signal triggered upon such detection and which would otherwise, for example, initiate non-activation, is suppressed, and the compressed mode pattern is activated.

Figure 1:
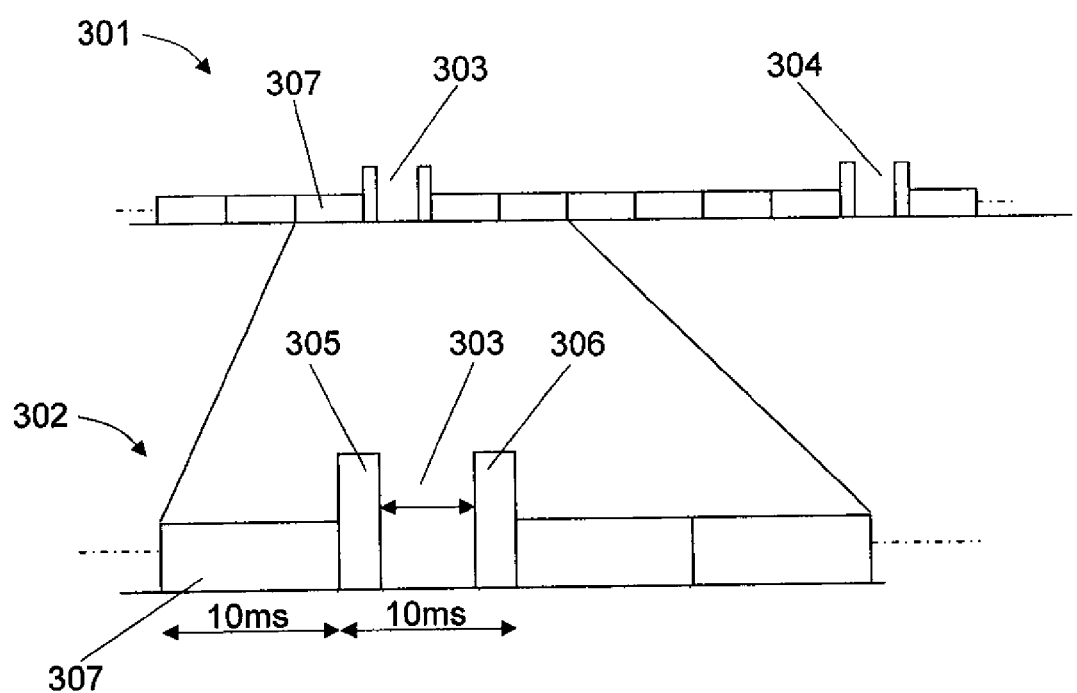
FIG. 1 shows the relative instantaneous transmit power for a plurality of frames including transmission gaps.
Figure 2:
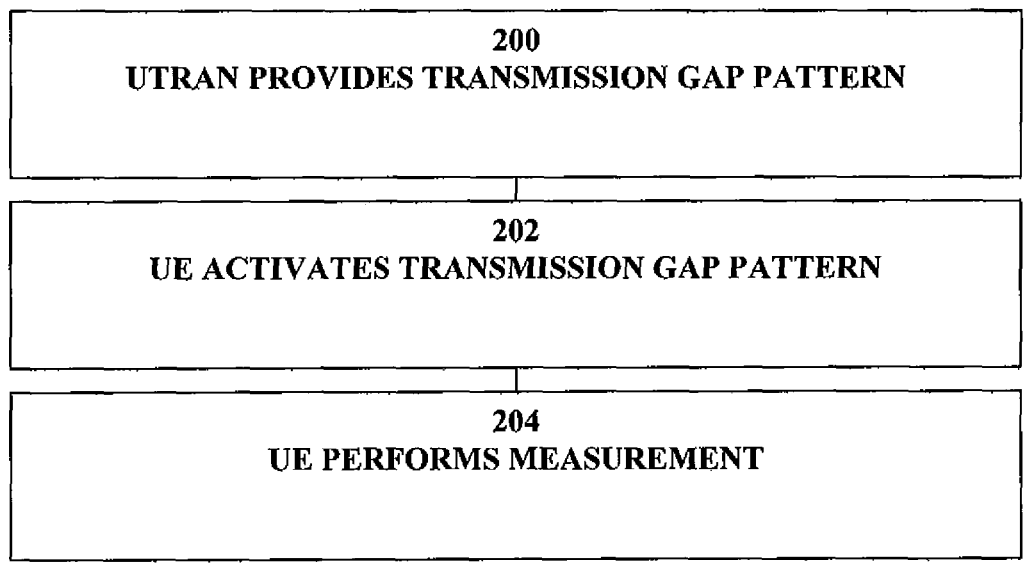
FIG. 2 shows activation of a transmission gap pattern sequence at a UE.
Figure 3:
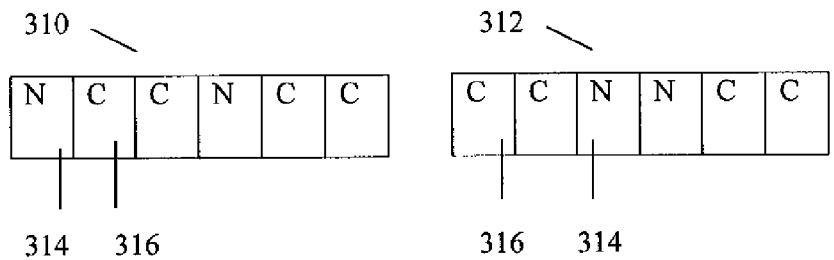
FIG. 3 shows consecutive transmission gap patterns sequences.

Referring, for example, to FIG. 5, therefore at step 500 the UTRAN provides the transmission gap pattern sequence. At step 502 the UE detects three or more consecutive compressed mode frames in a pattern or sequence. For example, referring to FIG. 3 the UE may detect that a sequence of consecutive patterns, the first ending in two compressed mode frames, and the second beginning in two compressed mode frames has been scheduled. This detection and checking operation can be carried out in any appropriate manner, for example by checking each pattern in the sequence. At step 504 the UE suppresses any non activation instruction issued upon their detection. For example such an instruction can be an internal warning which might otherwise result in a reboot or reset of the device. At step 506 the UE activates the pattern or sequence. The potential for lower throughput because of the existence of more gaps or channel drop is mitigated by meeting the specific pattern/pattern sequence requirements of the UTRAN, hence avoiding the delay of rebooting/resetting. The steps of FIG. 5 can be implemented in any appropriate fashion, for example in software in the form of a patch to the CM gap code.

Figure 6:
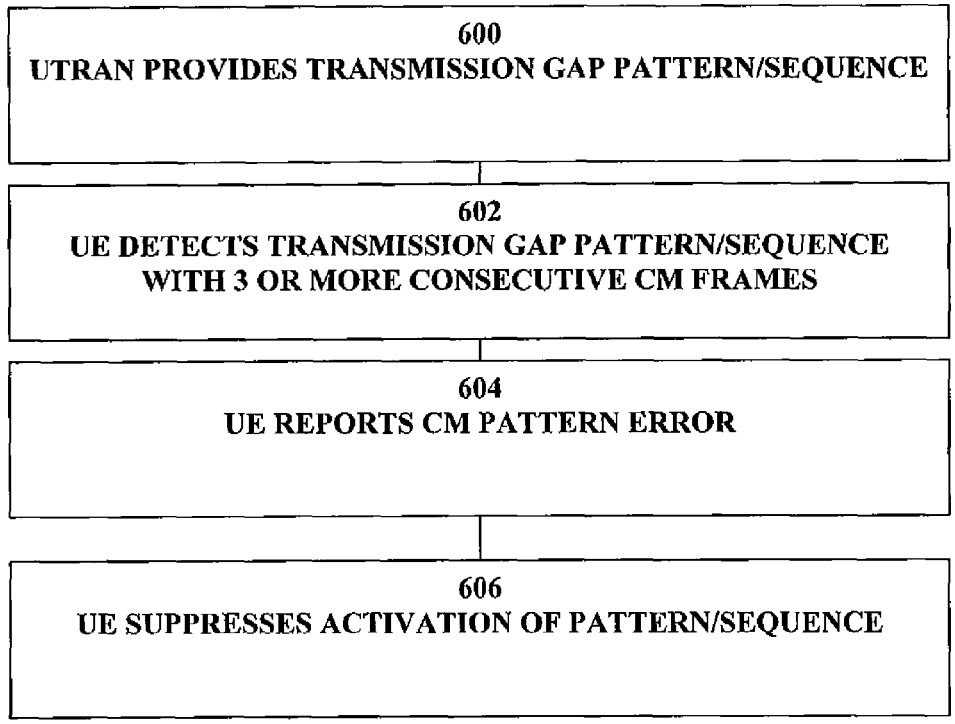
FIG. 6 shows a flow diagram of a method according to a second aspect.

According to a second mitigation routine, as shown with reference to FIG. 6, if a compressed mode pattern or pattern sequence results in three or more consecutive CM frames, such a pattern or pattern sequence is identified. The approach further comprises reporting a compressed mode pattern error and suppressing activation of all or part of the pattern or pattern sequence. This suppression may comprise suppression of one frame, one gap (which may be over two frames), one pattern (which may have two gaps), one pattern sequence (which way be finite or infinite), and one set of patterns (which may have up to 4 patterns in UMTS). In particular it will be noted that the UE sends out a "Physical channel Reconfiguration Failure" message in instances where multiple patterns are accepted and a problem is detected in run time, and the second aspect allows the same or a similar message to be issued whilst additionally suppressing activation of the message.

Referring to FIG. 6, at step 600 the UTRAN provides a transmission gap pattern or sequence of patterns and at step 602 the UE detects an alignment issue of the type described above forming a transmission gap pattern or sequence of patterns for three or more consecutive compressed mode frames. At step 604 optionally the UE reports a CM pattern error and at step 606 UE suppresses activation of the pattern or sequence.

Once again, the detection step comprises an up-front check which can be implemented for all embodiments described herein. In particular the system checks, for each pattern, which frames are CM frames, and then checks if there are any three frames in a row which are all CM frames.

Each pattern is generally defined as follows. In every pattern having a length of e.g. 12 frames the Nth frame (e.g. third) should be a compressed mode frame. Optionally the next frame will be compressed too, if the gap length (number of slots) is such that the gap extends beyond the end of the first frame.

In the 25.331 standard v5.19.0 patterns are described by Information Elements such as the following.

```
DPCH-CompressedModeStatusInfo::=SEQUENCE
    {tgps-Reconfiguration-CFN TGPS-Reconfigura-
    tion-CFN, tgp-SequenceShortList SEQUENCE
    (SIZE (1 ... maxTGPS)) OF TGP-Sequence-
    Short}
```

Accordingly by detecting frame length and identifying gaps, whether a frame is CM or normal can be detected, and then the existence of multiple sequential CM frames can similarly be identified.

Optionally, where the UTRAN is at risk of dropping the connection this can be mitigated by not reporting the failure on certain PLMNs, if this provides a net benefit despite not being able to do inter-frequency or inter-RAT measurements, for example because of avoidance of reset, or call drop. The approach can be implemented in software in any appropriate manner.

According to a third mitigation routine the UE monitors for a compressed mode pattern or pattern sequence resulting in three or more consecutive compressed mode gaps and if such a pattern or pattern sequence is identified, it inserts in the pattern or pattern sequence a normal frame before the compressed mode frame, for example after the second frame, by replacing the CM frame with a normal frame.

Referring to FIG. 7, at step 700 the UTRAN provides a transmission gap pattern or pattern sequence and at step 702 the UE detects whether there is a transmission gap pattern or pattern sequence with three or more consequence compressed node frames. At step 704 the UE inserts a normal frame (for example having 15 slots) before the third CM frame and at step 706 the UE activates the modified pattern or sequence. As a result the resulting pattern or sequence of patterns does not have the prohibited three or more consecutive compressed mode frames. Referring to for example, FIG. 8, a frame sequence 800 includes normal frames 802 and three consecutive CM frames 804. According to the method described in the third aspect the frame is modified to insert a normal frame 802 to replace CM frame in the sequence of compressed mode frames 804 in modified frame sequence 800a.

In order to determine whether a frame is compressed or normal the pattern provides relevant information as described above. For example the pattern may say that frames with CFN 100 and 101 are compressed, and the next 10 frames are normal, and this repeats every 12 frames. Thus frame N will be compressed according to this pattern if N−100 mod 12 is zero or one. If two frames in a row are compressed, and then any of the patterns make the next frame compressed too, the three in a row problem arises. In one embodiment it is possible to always put a normal frame after CM frames, although if UTRAN is operating the frame as a compressed frame, and UE is not, then both uplink and downlink data may be lost. When the normal frame is inserted after two CM frames, the three frames are three 10 ms periods. After two compressed frames the next frame will be treated as a normal frame rather than a compressed frame. So although the CM patterns may dictate "transmit and receive only in slots 0-3 and 11-14 in that frame", if it is made a normal frame it will transmit and receive in all 15 slots 0-14. Even if data is lost according to this approach, losing data frames is something that UMTS (or any radio protocol) deals with by retransmission. Even if frames are lost for measurement according to the approach the loss of a compressed mode for measurements can be dealt with by using the CM gaps that have not been lost.

Figure 9:
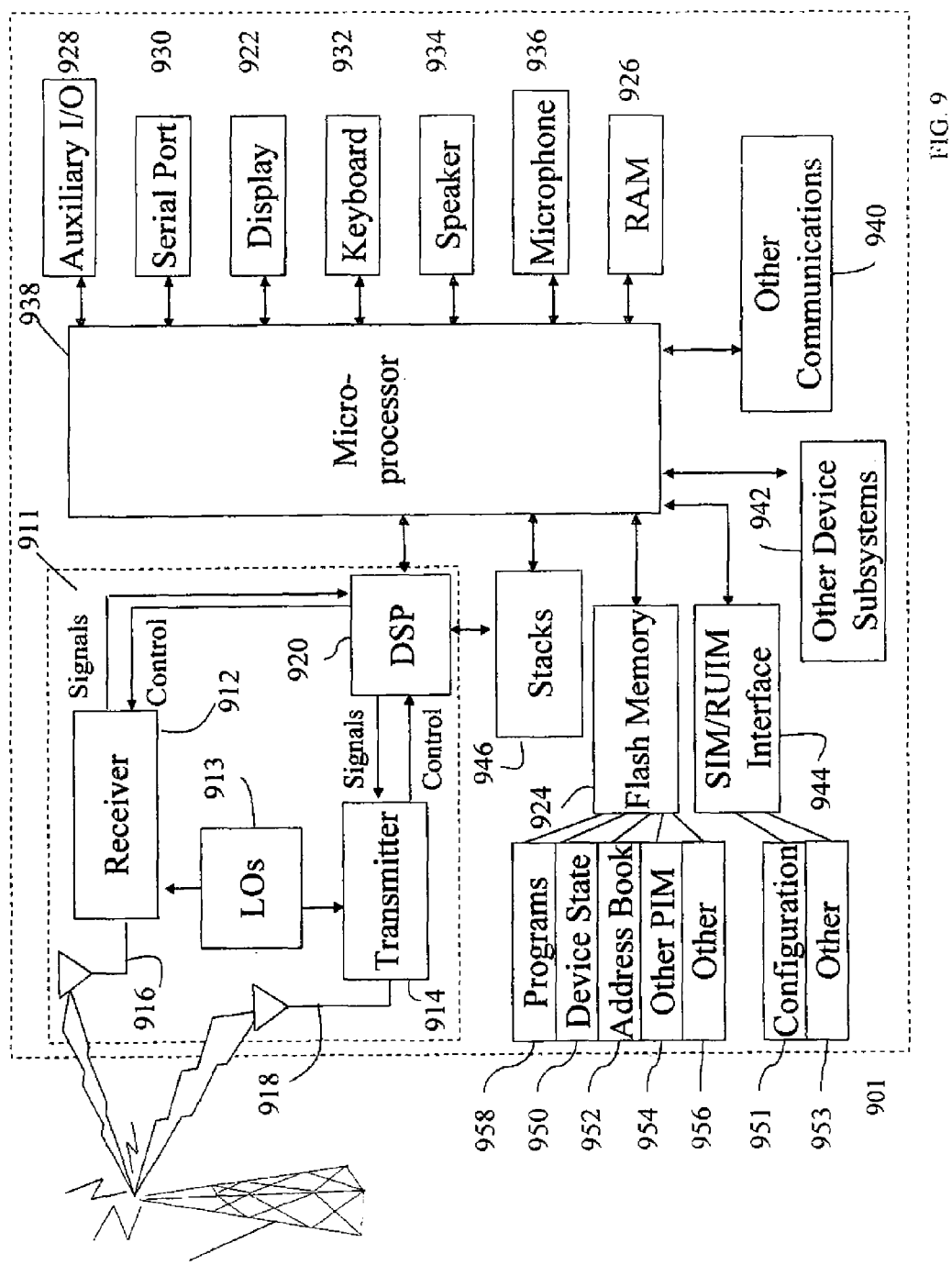
FIG. 9 shows a schematic diagram of typical mobile communication device.

Turning now to FIG. 9, this is a block diagram illustrating a mobile device, which can act as a UE and co-operate with the apparatus and methods of FIGS. 1 to 8, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 9, analogue to digital (A/D) conversion. ND conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analogue conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

As a result of the approach as described herein it will be seen that even where a UTRAN schedules in a transmission gap pattern or sequence or transmission gap patterns for a UE three or more consecutive compressed mode frames, continued operation of the UE is maintained according to the various aspects described herein.

The skilled reader will appreciate that any appropriate manner for implementing the additional steps described above at the UTRAN or UE can be adopted in hardware, software or firmware. For example the additional information elements can be implemented at the respective components in any appropriate manner.

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the steps performed, where the context permits, can be varied and to that extent the ordering of the steps as described herein is not intended to be limiting.

It is also to be noted that where a method has been described it is also intended that protection is also sought for a device arranged to carry out the method and where features have been claimed independently of each other these may be used together with other claimed features.

It will further be understood that the method and apparatus described herein can be applied in relation to any release or similar procedure following steps as set out in any appropriate standard and between any appropriate user equipment components and access network components or indeed between components of a similar nature.

Furthermore it will be noted that the apparatus described herein may comprise a single component such as a UE or UTRAN or other user equipment or access network components, a combination of multiple such components for example in communication with one another or a sub-network or full network of such components.

What is claimed is:

1. A method of configuring compressed mode operation comprising receiving a compressed mode pattern or pattern sequence having normal frames and compressed frames comprising gaps, detecting three or more consecutive compressed mode frames and implementing a mitigation routine,
   wherein mitigation routine comprises, if such a pattern or pattern sequence is detected, suppressing activation of all or a part of the pattern or pattern sequence,
   wherein the method further comprises reporting a compressed mode pattern error, and
   wherein the compressed mode pattern error report comprises a "Physical Channel Reconfiguration Failure" message.

2. An apparatus for configuring compressed mode operation comprising a receiver arranged to receive a compressed mode pattern or pattern sequence having normal and compressed frames comprising gaps, and a detector arranged to detect a compressed mode pattern or pattern sequence scheduling three or more consecutive compressed mode frames and implement a mitigation routine,
   wherein if such a pattern or sequence is identified, to suppress activation of the pattern or pattern sequence,
   wherein the processor is further arranged to report a compressed mode pattern error, and
   wherein the compressed mode pattern error report comprises a "Physical Channel Reconfiguration Failure" message.

* * * * *